US010564375B2

(12) United States Patent
Lee et al.

(10) Patent No.: US 10,564,375 B2
(45) Date of Patent: Feb. 18, 2020

(54) OPTICAL AND ELECTRICAL COMPOSITE MULTIMEDIA CABLE

(71) Applicant: LS Cable & System LTD., Anyang-si, Gyeonggi-do (KR)

(72) Inventors: Man-Su Lee, Gyeongsangbuk-do (KR); Yu-Hyoung Lee, Daegu (KR); Young-Ho Jun, Gumi-si (KR); Tae-Kyung Yook, Hwaseong-si (KR)

(73) Assignee: LS CABLE & SYSTEM LTD., Anyang-Si, Gyeonggi-Do (KR)

( * ) Notice: Subject to any disclaimer, the term of this patent is extended or adjusted under 35 U.S.C. 154(b) by 62 days.

(21) Appl. No.: 15/504,450

(22) PCT Filed: Jun. 11, 2015

(86) PCT No.: PCT/KR2015/005872
§ 371 (c)(1),
(2) Date: Feb. 16, 2017

(87) PCT Pub. No.: WO2016/027971
PCT Pub. Date: Feb. 25, 2016

(65) Prior Publication Data
US 2018/0224617 A1  Aug. 9, 2018

(30) Foreign Application Priority Data

Aug. 21, 2014  (KR) .................. 10-2014-0108790
Dec. 15, 2014  (KR) .................. 10-2014-0179986

(51) Int. Cl.
G02B 6/44  (2006.01)
H01B 11/22  (2006.01)
H01B 9/00  (2006.01)

(52) U.S. Cl.
CPC .......... *G02B 6/443* (2013.01); *G02B 6/4416* (2013.01); *H01B 9/005* (2013.01); *H01B 11/22* (2013.01); *G02B 6/4411* (2013.01)

(58) Field of Classification Search
None
See application file for complete search history.

(56) References Cited

U.S. PATENT DOCUMENTS 6,236,789 B1 * 5/2001 Fitz .................. G02B 6/4416
385/100
2013/0129288 A1 * 5/2013 Homma .............. G02B 6/4401
385/101
2014/0369656 A1 * 12/2014 Gimblet ............. G02B 6/02395
385/113

FOREIGN PATENT DOCUMENTS

JP  2001-312926 A  11/2001
JP  2001-318286 A  11/2001
(Continued)

OTHER PUBLICATIONS

Machine translation for JP2001-312926 to Furukawak Electric Co., LTD, Nov. 9, 2001.*
(Continued)

*Primary Examiner* — Jerry Rahll
(74) *Attorney, Agent, or Firm* — K&L Gates LLP

(57) ABSTRACT

An optical and electrical composite multimedia cable including: an optical unit including a plurality of optical fibers and an optical-fiber protective layer, the optical-fiber protective layer formed by filling gaps between the optical fibers with curable resin and covering outer sides of the optical fibers with the curable resin and then curing the curable resin; a plurality of conductor units each including a conductor and an insulator covering the conductor; and an outer jacket provided around the optical unit and the conductor units.

18 Claims, 6 Drawing Sheets

(56) References Cited

FOREIGN PATENT DOCUMENTS

| | | |
|---|---|---|
| JP | 2005-055779 A | 3/2005 |
| JP | 2012-053121 A | 3/2012 |
| JP | 2012-248343 A | 12/2012 |
| JP | 2013-218839 A | 10/2013 |
| KR | 10-2009-0095876 A | 9/2009 |

OTHER PUBLICATIONS

Nov. 3, 2017, Chinese Office Action for related CN application No. 201580045025.6.
International Search Report for PCT/KR2015/005872 dated Sep. 10, 2015 from Korean Intellectual Property Office.

* cited by examiner (a)

(b)

OPTICAL AND ELECTRICAL COMPOSITE MULTIMEDIA CABLE

CROSS REFERENCE TO PRIOR APPLICATIONS

This application is a National Stage Patent Application of PCT International Patent Application No. PCT/KR2015/005872 (filed on Jun. 11, 2015) under 35 U.S.C. § 371, which claims priority to Korean Patent Application Nos. 10-2014-0108790 (filed on Aug. 21, 2014) and 10-2014-0179986 (filed on Dec. 15, 2014), which are all hereby incorporated by reference in their entirety.

TECHNICAL FIELD

The present invention relates to an optical and electrical composite multimedia cable. More particularly, the present invention relates to an optical and electrical composite multimedia cable manufactured by a simple process and having a minimum diameter.

BACKGROUND ART

Recently, use of equipment for a high-definition multimedia interface (HDMI) standard which is one of interface standards for transmitting uncompressed digital video and audio signals in an integrated manner has been widespread. The HDMI standard is the integration of a digital visual interface (DVI) which is a video interface standard for a personal computer (PC) and a display and a standard for an audio signal for audio/video (A/V) home appliances. In the HDMI standard, a video signal and an audio signal are transmitted from a signal providing device to a device which outputs a video signal and an audio signal, e.g., a television (TV), without compressing them. Thus, a decoder chip or software is not needed. The HDMI standard may replace an existing analog terminal, and has been extensively applied to PCs, DVD players, HDTVs, etc.

A multimedia device may be connected to a multimedia device which provides a combined audio/video (A/V) signal via a cable and a connector supported by the HDMI standard so as to receive the combined A/V signal and output a video signal and an audio signal.

Conventionally, a conductor such as copper has been generally used as a cable according to the HDMI standard. However, when the cable is long, a signal loss rate is high and thus high video and sound quality of uncompressed digital video and audio signals is not secured.

Recently, this problem becomes more serious when the distance between a multimedia signal device providing a combined A/V signal and a multimedia output device (e.g., a projector, a large-sized screen, or a speaker) receiving the combined A/V signal from the multimedia signal device and outputting a video signal and an audio signal in a place such as a large-sized stadium, a lecture room, and a hall, as well as home, is several tens of meters or several hundreds of meters or more.

Thus, an optical and electrical composite multimedia cable has been recently introduced as a cable supported by the HDMI standard.

That is, the optical and electrical composite multimedia cable may include an optical unit having optical fibers and a conductor unit having a conductor. A video signal or an audio signal is transmitted via the optical fibers of the optical and electrical composite multimedia cable, and power or a control signal may be provided via the conductor.

Existing optical and electrical composite multimedia cables, a plastic optical fiber (POF) type cable and a glass optical fiber (GOF) type cable are classified according to the type of optical fibers have been introduced.

The size of a POF type cable is large due to the diameter of optical fibers thereof. In general, a GOF type cable may have a large diameter and have an asymmetric or flat cross section due to the diameter of a unit protecting GOF type optical fibers which are likely to be broken.

FIG. 5 is a cross-sectional view of a conventional POF type optical and electrical composite multimedia cable 10.

In the case of optical fibers of a POF type optical cable, a signal loss rate is high and thus a maximum signal loss measuring distance is limited to 250 m. Thus, each of the optical fibers should be produced in units of 500 meters or less for bi-directional measurement so that a failure in the optical fibers may be detected. Furthermore, when this cable is installed, the amount of the cable wasted is large and work continuity is low.

An optical unit 1 included in a flat hybrid optical and electrical cable and having POF type optical fibers is likely to deteriorate at high temperatures and freeze at low temperatures and thus characteristics thereof may be degraded after a long time. Thus, installation of the cable in an environment such as an outdoor place is restricted. Furthermore, each of POF type optical fibers has a large diameter, e.g., 300 µm or more, and thus minimizing the diameter of the cable 10 is limited.

The conventional optical and electrical composite multimedia cable 10 having a flat shape employs POFs and may be thus connected to a terminal in a simple manner, but directionality thereof is limited when it is bent and workability thereof may be low when pipe installation is conducted, due to the flat shape thereof.

A short width w of the optical and electrical composite multimedia cable 10 having the flat shape is small but a long width W thereof is large. Thus, it should be careful not to twist the cable 10 when the cable 10 is wound and a finished product has a large volume. When actually measured, the short width w of the cable 10 is 2.8 mm and the long width W thereof is 5.0 mm or more. Thus, the volume of a packed unit product for long-distance installation is significantly increased.

Due to the above reasons, for long-distance connection, it is preferable that an optical and electrical composite multimedia cable be manufactured to employ GOF type optical fibers to minimize the length of the cable wasted when installed, to sufficiently protect the optical fibers, to minimize the diameter of the cable, and not to be limited in terms of an installation direction when installed.

FIG. 6 illustrates a reference diagram of Japanese unexamined patent application publication No. 2013-218839.

As illustrated in FIG. 6, wires 15 are disposed around an optical fiber core 12 to decease the size of a cable. However, optical fiber cores 12a and 12b of a hybrid optical and electrical cable are in a coated state and are accommodated in a protective tube 13. Thus, an empty space inside the protective tube 13 is large, and the wires 15 disposed at an outer side of the protective tube 13 are spaced apart from each other. Therefore, an empty space between the wires 15 is significantly large and it is thus difficult to decrease the diameter of the cable 10.

FIG. 7 illustrates a reference diagram of Japanese unexamined patent application publication No. 2012-53121.

As illustrated in FIG. 7, a plurality of wires 15 are disposed around optical fiber cores 1, and covered with a skin 20.

However, when the wires 15 are disposed around the optical fiber cores 1 and covered with the skin 20 in a state in which the optical fiber cores 1 having a relatively small diameter are arranged at a center of a cable without being configured as separate units, it is difficult to sufficiently protect the optical fiber cores 1 and provide a flat mounting surface on the optical fiber cores 1 to dispose the wires 15 around the optical fiber cores 1. Accordingly, it is not easy to manufacture the cable to have a round cross section, and a process of manufacturing the cable may be complicated. Furthermore, an empty space between the optical fiber cores 1 may be large and thus the diameter of the cable is not easily decreased.

DETAILED DESCRIPTION OF THE INVENTION

Technical Problem

The present invention is directed to an optical and electrical composite multimedia cable manufactured by a simple process and having a minimum diameter.

Technical Solution

According to an aspect of the present invention, there is provided an optical and electrical composite multimedia cable comprising an optical unit including a plurality of optical fibers and an optical-fiber protective layer, the optical-fiber protective layer formed by filling gaps between the optical fibers with curable resin and covering outer sides of the optical fibers with the curable resin and then curing the curable resin, a plurality of conductor units each including a conductor and an insulator covering the conductor and an outer jacket provided around the optical unit and the conductor units.

And the gaps between the optical fibers may be filled with the curable resin.

And the curable resin may comprise UV curable acrylate resin and may be cured by UV radiation.

And the optical unit may have a diameter of 0.5 mm to 2.0 mm.

And the outer jacket may have a thickness of 0.3 mm to 1.0 mm.

And the distances between the optical fibers and an outer circumference surface of the optical unit may be 0.03 mm to 0.20 mm.

And a ratio of a total area of the optical fibers to an area of the optical unit may be in a range of 30% to 80%.

And the optical fibers may be glass optical fiber (GOF) type optical fibers each including a core, a cladding, a first coating layer, and a second coating layer.

And the optical unit may be provided at a center part of the cable and the conductor units are provided to surround the optical unit.

And each of the conductor units may contact with two conductor units adjacent thereto and the optical unit.

And conductors of the conductor units may have a diameter of 36 AWG to 24 AWG.

And each of the conductor units may comprise one conductor and has a diameter of 0.5 mm to 1.0 mm.

And a tensile material may be provided at an inner side of the outer jacket to cover the optical unit and the conductor units.

And one optical unit and two to twelve conductor units may be provided.

And when one optical unit and two or three conductor units are provided, the optical unit and the conductor units may be arranged in a triangular or rectangular shape.

And when one optical unit and four to twelve conductor units are provided, the optical unit may be provided at the center part and the conductor units are arranged to surround the optical unit.

And the optical and electrical composite multimedia cable may further comprise at least one tension wire at an inner side of the outer jacket.

And one optical unit and six conductor units surrounding the optical unit may be arranged, and a diameter of the optical and electrical composite multimedia cable may be 2.1 mm to 6.0 mm.

And the outer jacket may be formed of a polyvinyl chloride material.

And the optical and electrical composite multimedia cable may have a round cross section.

According to an aspect of the present invention, there is provided an optical and electrical composite multimedia cable comprising an optical unit including a plurality of glass optical fiber (GOF) type optical fibers and an optical-fiber protective layer which is formed by curing UV curable acrylate resin to cover the optical fibers, the optical unit having a diameter of 0.5 mm to 2.0 mm, a plurality of conductor units each including one conductor and an insulator covering the conductor and having a diameter of 0.5 mm to 1.0 mm, the conductor units provided around the optical unit, a tensile material surrounding the conductor units and an outer jacket covering an outer side of the tensile material and having a thickness of 0.3 mm to 1.0 mm, wherein a ratio of the diameter of the optical unit to the diameter of each of the conductor units is in a range of 0.7 to 2.9, and a diameter of the cable is in a range of 2.1 mm to 6.0 mm.

And the six conductor units may be arranged around the optical unit provided at a center part of the cable.

And each of the conductor units may contact with two conductor units adjacent thereto and the optical unit.

And each of the optical fibers may comprise a core, a cladding, a first coating layer, and a second coating layer.

And the distances between the optical fibers and an outer circumference surface of the optical unit may be 0.03 mm to 0.20 mm.

And a ratio of a total area of the optical fibers to an area of the optical unit may be in a range of 30% to 80%.

Advantageous Effects

In an optical and electrical composite multimedia cable according to the present invention, an empty space inside an optical unit of the cable, empty spaces between the optical unit and conductor units, and an empty space between the conductor units may be minimized to minimize the diameter of the cable.

In the optical and electrical composite multimedia cable according to the present invention, the optical unit and the conductor units may be arranged such that a round cross section of the cable is easily maintained, thereby minimizing an empty space in the cable.

In the optical and electrical composite multimedia cable according to the present invention, the cable has a round shape to prevent it from being limited in terms of directionality when installed and to minimize damage to the cable when bent or chafed in long-distance installation.

In the optical and electrical composite multimedia cable according to the present invention, glass optical fibers may be employed rather than plastic optical fibers to minimize a signal loss rate according to the length of the cable, the length of a cable of a unit product may be set to be sufficiently long to minimize the amount of the cable wasted when manufactured, and environmental constraints, e.g., temperature, under a cable installation environment according to characteristics of the glass optical fibers may be minimized.

Furthermore, in the optical and electrical composite multimedia cable according to the present invention, optical fibers of the optical unit are formed in a round or polygonal shape using curable resin and are then used as elements of the cable. Thus, an additional buffering process, etc. performed in units of the optical fibers may be skipped and thus a manufacturing process may be simplified.

In addition, the design of the optical and electrical composite multimedia cable according to the present invention may be variously changed according to a user's demand, e.g., by adjusting the number of optical units and the number of conductor units if necessary or by interposing a tensile wire into a location corresponding to the optical unit or locations corresponding to the conductor units.

MODE OF THE INVENTION

Figure 1:
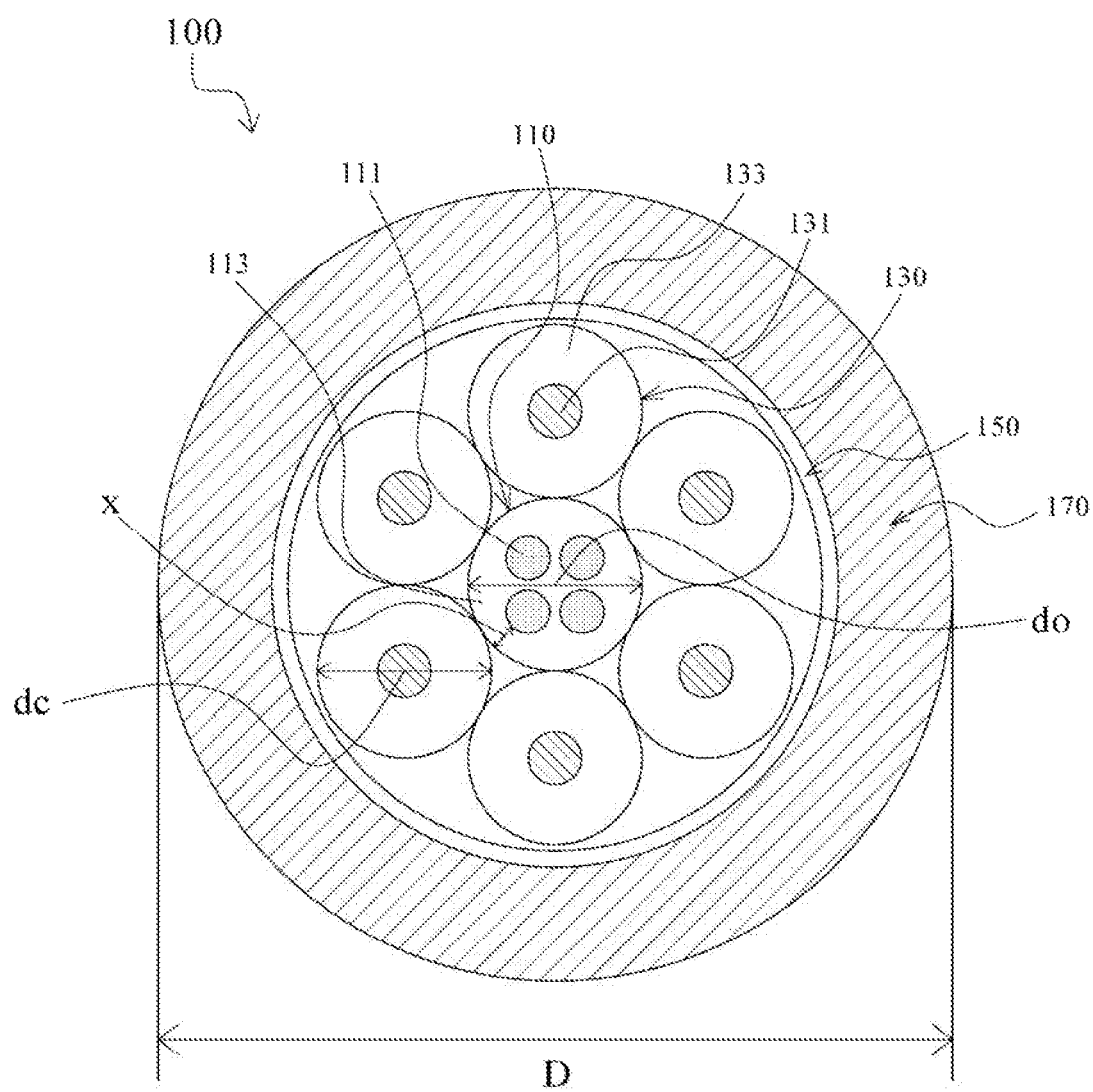
FIG. 1 is a cross-sectional view of an optical and electrical composite multimedia cable according to an embodiment of the present invention.

Hereinafter, exemplary embodiments of the present invention will be described in detail with reference to the accompanying drawings. However, the present invention is not limited to the embodiments set forth herein and may be embodied in many different forms. Rather, these embodiments are provided so that this disclosure will be thorough and complete and will fully convey the concept of the invention to those of ordinary skill in the art. The same reference numerals represent the same elements throughout the present disclosure.

FIG. 1 is a cross-sectional view of an optical and electrical composite multimedia cable 100 according to an embodiment of the present invention. In the optical and electrical composite multimedia cable 100 according to the present invention, gaps between a plurality of optical fibers 111 are filled with curable resin and outer sides of the optical fibers 111 may be also covered with the curable resin.

An optical-fiber protective layer 113 is formed by filling the gaps between the optical fibers 111 with the curable resin and covering the optical fibers 111 with the curable resin. Here, the term "optical fiber" should be understood as an individual optical fiber core.

The curable resin may be UV-curable acrylate resin and may be cured by UV irradiation.

More preferably, when the gaps between the optical fibers 111 are filled with the curable resin, the optical fibers 111 and empty spaces between the optical fibers 111 are minimized.

The optical and electrical composite multimedia cable 100 according to the present invention may include an optical unit 110 having the optical-fiber protective layer 113 formed by curing curable resin to fill the optical fibers 111 and the gaps between the optical fibers 111 and covering the outer sides of the optical fibers 111, a plurality of conductor units 130 each having a conductor 131 and an insulator 133 covering the conductor 131, and an outer jacket 170 disposed around the optical unit 110 and the conductor units 130.

The optical unit 110 of the optical and electrical composite multimedia cable 100 according to the present invention may include the optical-fiber protective layer 113 cured in a state in which the gaps between at least one optical fiber 111 are filled with the curable resin and the outer sides of the optical fibers 111 are covered with the curable resin, and may be formed to have a round or polygonal cross section.

The optical and electrical composite multimedia cable 100 according to the present invention is designed to sufficiently protect the optical fibers 111 therein and minimize a diameter of the optical and electrical composite multimedia cable 100. Thus, glass optical fiber (GOF) type optical fibers are applied as the optical fibers 111 to decrease a long-distance signal loss and minimize the diameter thereof.

In general, communication using optical fiber uses a light propagation principle that when light propagates within the optical fiber from a material having a high refractive index to a material having a low refractive index, the light is totally reflected at certain angles or less from an interface between the materials.

The POF type optical fibers have a large diameter and a signal loss rate is high according to the length thereof, compared to glass optical fiber (GOF) type optical fibers, and are thus limited in terms of long-distance device connection.

Basically, POF type optical fibers have a diameter of about 300 μm or more and thus the diameter of an optical unit is very large when the diameter of a buffer for identification and protection of the optical fibers and the like are taken into account.

A single optical fiber may include a core, a cladding, a first coating layer, and a second coating layer. An optical signal containing information is reflected from an interface between the core having a high refractive index and the cladding having a low refractive index and propagates along the core of the optical fiber.

The core is formed of a germanium (Ge)-added silica material to slightly increase the refractive index thereof. In general, the first coating layer and the second coating layer may be coated with UV-curable resin or the like and be then cured.

GOF type optical fibers have a diameter of about 200 μm or less and are thus more advantageous in minimizing the diameter of a cable than the POF type optical fibers.

An optical and electrical composite multimedia cable according to the present invention employs GOF type optical fibers rather than POF type optical fibers and is thus capable of minimizing the diameter of an optical unit and minimizing a signal loss rate according to the length of the cable. In addition, the length of a cable of a unit product may be set to be sufficiently long to minimize the amount of the cable wasted when produced, and environmental constraints, e.g., temperature, under a cable installation environment according to characteristics of glass optical fibers may be minimized.

The curable resin for forming the optical-fiber protective layer 113 including the optical fibers 111 may be UV curable acrylate resin. The optical-fiber protective layer 113 is preferably formed not to have an empty space in the optical unit 110.

When an empty space is formed in the optical-fiber protective layer 113, the diameter of the optical unit 110 is increased by the empty space. Thus the optical-fiber protective layer 113 should have no empty space or a minimum empty space to minimize the diameter of the optical unit 110.

Even if an empty space is not formed in the optical-fiber protective layer 113, the distance X between the optical fibers 111 and an outer circumference surface of the optical unit 110 is preferably in a range of 0.03 mm to 0.20 mm so that the optical-fiber protective layer 113 may sufficiently protect the optical fibers 111.

Furthermore, when the optical fibers 111 are provided, it is preferable that gaps between the optical fibers 111 spaced apart from each other be filled with the curable resin and be then cured to minimize an empty space, as illustrated in FIG. 1.

With the above method, in the optical and electrical composite multimedia cable 100 according to the present invention, the optical fibers 111 may be densely arranged to form a single optical unit 110 and thus the diameter of the optical unit 110 may be very small.

Since the optical fibers 111 may be primarily coated and secondarily coated with UV curable acrylate resin as described above, it may be considered that the core of each of the optical fibers 111 of the optical unit 110 is coated or covered with three or more layers of UV curable resin.

In this case, gaps between the optical fibers 111 included in the optical-fiber protective layer 113 formed of the curable resin may be removed or minimized and thus the diameter of the optical unit 110 may be minimized.

When four optical fibers 111 were included in the optical unit 110 and the optical fibers 111 corresponding to four cores were arranged in parallel to one another and cured in a round or polygonal shape using UV curable acrylate resin in the embodiment of FIG. 1, a diameter Do of the optical unit 110 was 0.5 mm to 2.0 mm. A ratio of a total area of the optical fibers 111 to an area of the optical unit 110 was in a range of 30% to 80%.

As a result of forming the optical-fiber protective layer 113 for protection of the optical fibers 111 by curing it with UV curable acrylate resin, the optical-fiber protective layer 113 had higher strength, hardness, and elasticity than those of a general PVC-coated product, and may be thus combined in parallel to the center of the cable 100 or an insulating conductor, thereby minimizing damage to the cable 100 when the cable 100 was bent or shrank.

Since the optical fibers 111 of the optical unit 110 are formed of curable resin and used as elements of the cable 100, a ribbon process or a buffer process conducted according to the type of fiber may be skipped unlike a conventional optical and electrical composite multimedia cable. Thus, a manufacturing process may be simplified to save manufacturing costs.

The conductor units 130 may be provided around the optical unit 110. In the embodiment of FIG. 1, six conductor units 130 are provided around one optical unit 110.

Each of the conductor units 130 according to the present invention may include one conductor 131 to minimize the diameter thereof. The conductor 131 may have a diameter of 36 AWG to 24 AWG.

The conductor 131 may be formed of a copper material and the insulator 133 may be formed of various materials. Polyvinyl chloride (PVC) or the like may be used as a material of the insulator 133.

The conductor 131 having the size described above may be covered with the insulator 133. Each of the conductor units 130 including one conductor 131 covered with the insulator 133 may have a diameter dc of 0.5 mm to 1.0 mm.

As illustrated in FIG. 1, when one optical unit 110 is arranged at the center part of the cable 100, six conductor units 130 are arranged around the optical unit 110, and the diameters of the optical unit 110 and the conductor units 130 satisfy the above diameter conditions, each of the conductor units 130 may contact with two conductor units 130 adjacent thereto and the optical unit 110 at the center part. That is, conductor units 130 around the optical unit 110 are controlled to be in contact with the optical unit 110 and two conductor units 130 adjacent thereto to minimize empty spaces between the conductor units 130. Therefore, the diameter of the cable 100 may be minimized.

When the diameters of the conductor units 130 and the optical unit 100 are controlled such that each of the conductor unit 130 are in contact with conductor units 130 adjacent thereto and the optical unit 110 at the center part, the number of conductor units 130 may be increased. About two to twelve conductor units 130 are preferably provided.

The outer jacket 170 may be provided at the outer sides of the conductor units 130 surrounding the optical unit 110, and a tensile material 150 may be provided at an inner side of the outer jacket 170 to cover the optical unit 110 and the conductor units 130.

A length of the optical and electrical composite multimedia cable 100 installed according to the present invention may be 100 m or more according to an installation environment. A high tension may be applied to a long-distance cable when the cable is bent or chafed in an installation environment. Thus, the tensile material 150 is provided at the inner side of the outer jacket 170 to cover the optical unit 110 and the conductor units 130 so as to reinforce the mechanical hardness of the cable 100. The tensile material 150 may be aramid yard or the like.

A sufficient amount of aramid yarn serving as the tensile material 150 is used to cover outer sides of the optical unit 110 and the conductor units 130. Thus, the optical unit 110 and the conductor units 130 which are inner elements are not directly in contact with the outer jacket 170 to prevent them from being adhered to one another.

The outer jacket 170 may be formed to a thickness of 0.3 mm to 1.0 mm using a resin material such as polyvinyl chloride (PVC)

In the optical and electrical composite multimedia cable 100 of FIG. 1 having the above elements according to the present invention, one optical unit 110 and six conductor units 130 are arranged to surround the optical unit 110. A diameter D of the optical and electrical composite multimedia cable 100 is measured to be 3.2 mm to 3.6 mm and is thus much less than that of a conventional flat optical and electrical composite multimedia cable having a long width of about 5 mm or more.

When one optical unit 110 and six conductor units 130 surrounding the optical unit 110 are provided, the diameter of the cable 100 may be variously adjusted to be in a range of 2.1 mm to 6.0 mm by adjusting the diameters of the optical unit 110 and the conductor units 130 to be in the ranges described above. Thus, even if the number of optical units 110 and the number of conductor units 130 are defined in consideration of the use of a product or the like, the diameter of the cable 100 may be variously changed.

According to this method, the optical and electrical composite multimedia cable 100 of FIG. 1 includes one optical unit 110 at the center part thereof and include six conductor units 130 around the optical unit 110 to minimize an empty space therein, and may have a cross section having a shape similar to a round shape while being covered by the outer jacket 170. Thus, since the cable 100 has a round shape, a cable installation direction is not limited when it is installed over long distances and damage caused to the cable 100 when the cable 100 is bent or chafed during installation of the cable 100 may be minimized.

Figure 2:
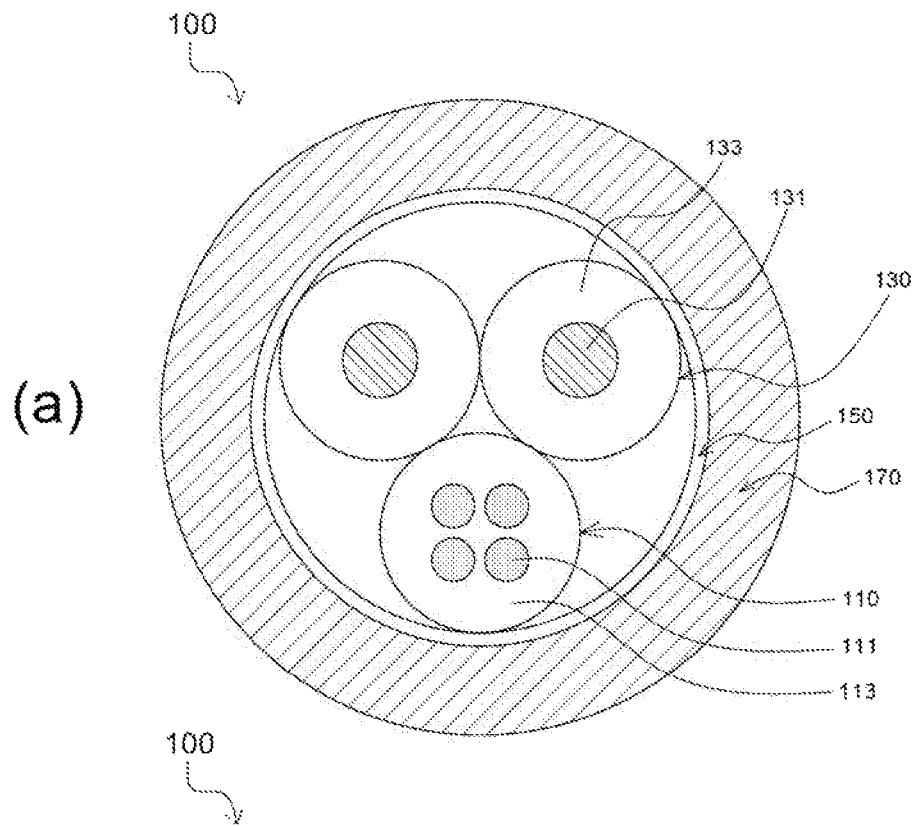
FIG. 2 illustrates cross-sectional views of optical and electrical composite multimedia cables according to embodiments of the present invention.
Figure 2:
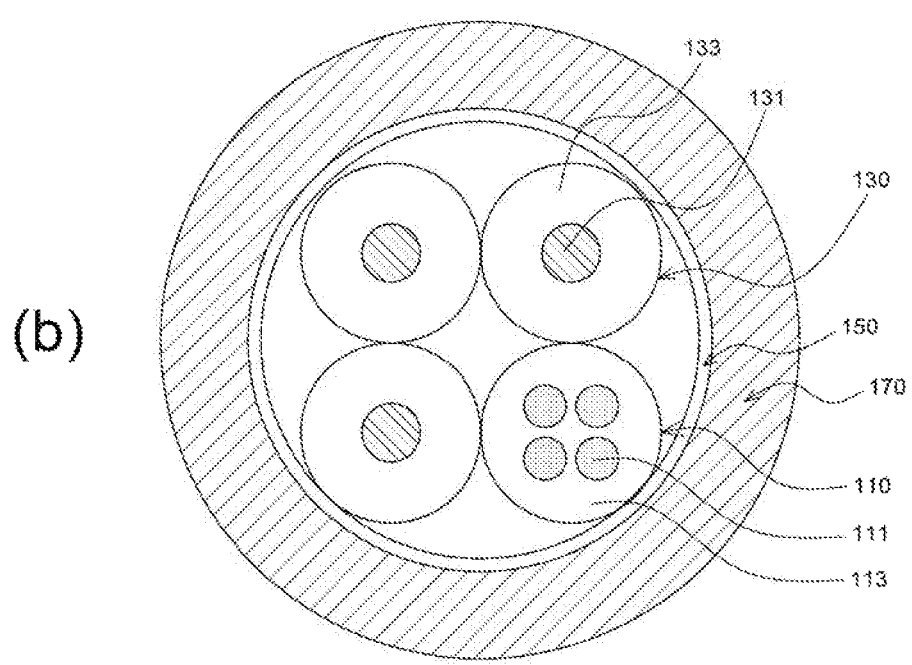

FIG. 2 illustrates cross-sectional views of optical and electrical composite multimedia cables 100 according to embodiments of the present invention. In detail, FIG. 2(a) is a cross-sectional view of an optical and electrical composite multimedia cable 100 in which one optical unit 110 and two conductor units 130 are arranged in a triangular shape. FIG. 2(b) is a cross-sectional view of an optical and electrical composite multimedia cable 100 in which one optical unit 110 and three conductor units 130 are arranged in a rectangular shape.

Unlike in the embodiment of FIG. 1, one optical unit 110 and two conductor units 130 are provided in the embodiment of FIG. 2(a) and one optical unit 110 and three conductor units 130 are provided in the embodiment of FIG. 2(b).

In the optical and electrical composite multimedia cables 100 according to the present invention described above, one optical unit 110 and a sufficient number of conductor units 130 surrounding the optical unit 110 are provided.

However, a number of conductor units 130 insufficient to surround the optical unit 110 may be provided if necessary. In this case, the optical unit 110 cannot be arranged on a center part of the cable 100 and the optical unit 110 and the conductor units 130 may be arranged in a polygonal shape such as a triangular or rectangular shape without discriminating them from one another.

Thus, when the number of units constituting each of the cables 100 according to these embodiments is three or four, e.g., when one optical unit 110 and two or three conductor units 130 are provided, it is inefficient and a large unnecessary space may occur when the optical unit 110 is arranged on the center part of the cable 100. Thus, the optical unit 110 and the conductor units 130 may be arranged in a triangular or rectangular shape to minimize spaces wasted.

In the embodiments of FIGS. 2(a) and (b), these units are arranged in the triangular or rectangular shape to minimize spaces wasted, so that the cables 100 may have a cross section having a shape similar to a round shape while being covered with an outer jacket 170.

According to the number of insulating conductors, the optical unit 110 may be arranged at the center part of the cable 100 or arranged in parallel to the conductor units 130. The insulating conductors may be twisted together (assembled or jointed together) to minimize stress caused thereto when bent.

The optical unit 110 having a round shape and the insulating conductors may be effectively arranged to remove spaces wasted, so that the cable 100 may have a round shape and have an optimum diameter.

In conclusion, when one optical unit 110 and two or three conductor units 130 are provided, the optical unit 110 and the conductor units 130 are preferably arranged in the triangular or rectangular shape.

Figure 3:
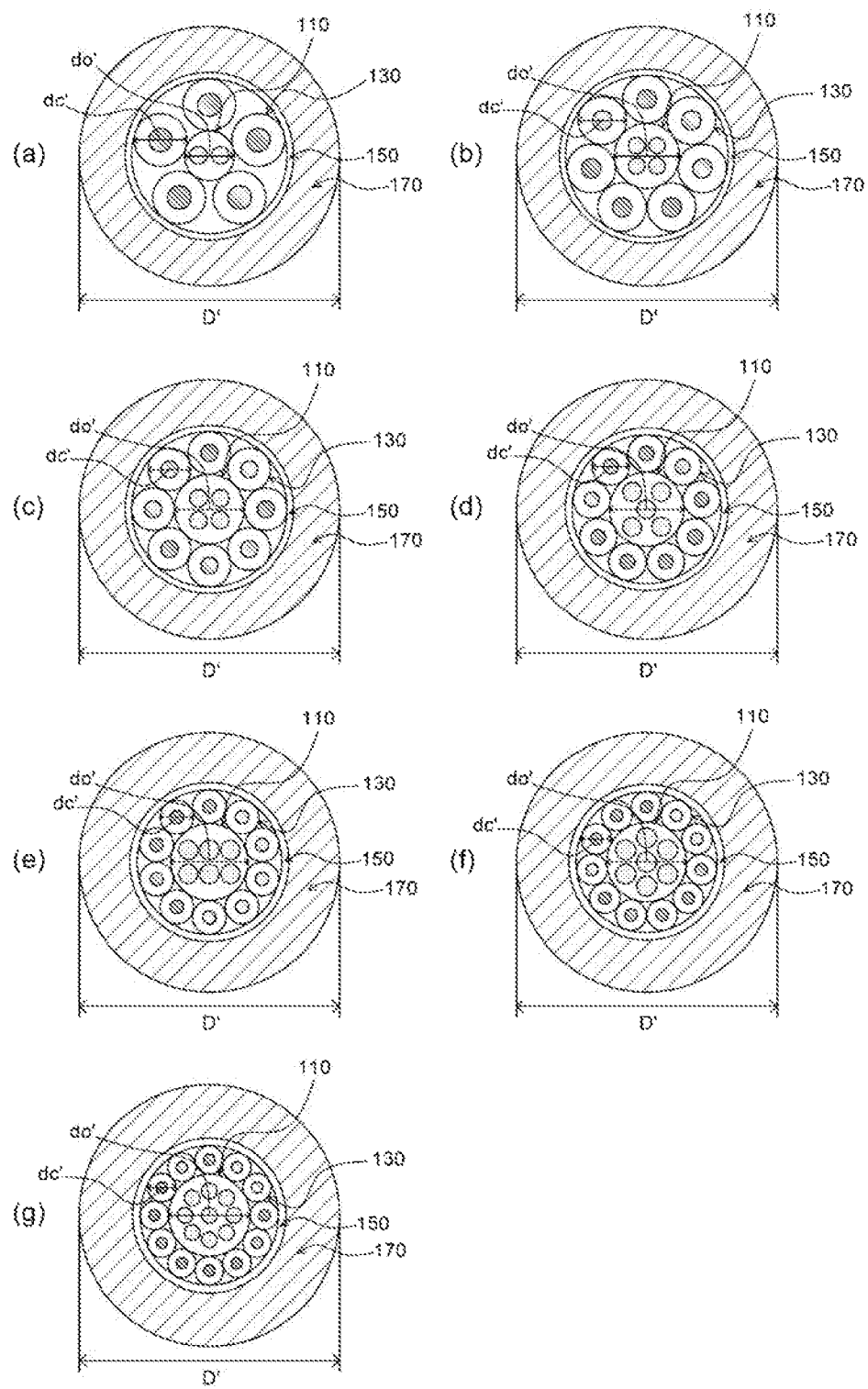
FIG. 3 illustrates cross-sectional views of optical and electrical composite multimedia cables according to embodiments of the present invention.

FIG. 3 illustrates cross-sectional views of optical and electrical composite multimedia cables 100 according to embodiments of the present invention.

In detail, FIG. 3(a) is a cross-sectional view of an optical and electrical composite multimedia cable 100 in which five conductor units 130 are arranged around one optical unit 110. FIG. 3(b) is a cross-sectional view of an optical and electrical composite multimedia cable 100 in which seven conductor units 130 are arranged around one optical unit 110. FIG. 3(c) is a cross-sectional view of an optical and electrical composite multimedia cable 100 in which eight conductor units 130 are arranged around one optical unit 110. FIG. 3(d) is a cross-sectional view of an optical and electrical composite multimedia cable 100 in which nine conductor units 130 are arranged around one optical unit 110. FIG. 3(e) is a cross-sectional view of an optical and electrical composite multimedia cable 100 in which ten conductor units 130 are arranged around one optical unit 110. FIG. 3(f) is a cross-sectional view of an optical and electrical composite multimedia cable 100 in which eleven conductor units 130 are arranged around one optical unit 110. FIG. 3(g) is a cross-sectional view of an optical and electrical composite multimedia cable 100 in which twelve conductor units 130 are arranged around one optical unit 110.

Basically, an optical and electrical composite multimedia cable 100 according to the present invention may include one optical unit 110 at a center part thereof and two to twelve conductor units 130 surrounding the optical unit 110. The number of optical fibers 111 constituting the optical unit 110 may be increased or decreased as needed.

Although the optical unit 110 is a four-core optical unit having four optical fibers 111 as cores in the embodiment described above with reference to FIG. 1, one to twelve optical fibers may constitute the optical unit 110. As the number of cores of the optical unit 110 is increased, the diameter of the optical unit 110 may be 0.50 to 1.35 mm in the case of the optical unit 110 having one to four cores, may be 0.75 to 1.50 mm in the case of the optical unit 110 having five or six cores, may be 0.95 to 1.70 mm in the case of the optical unit 110 having seven or eight cores, or may be 1.00 to 2.00 mm in the case of the optical unit 110 having nine to twelve cores. The diameter of the optical unit 110 may be effectively decreased compared to when POF type optical fibers 111 are used. In conclusion, the number of optical fibers of an optical unit of an optical and electrical composite multimedia cable according to the present invention may be twelve or more, and an external diameter of the optical unit may be in a range of about 0.5 mm to 2.0 mm. Furthermore, a diameter dc' of the conductor unit 130 having a single conductor may be 0.5 mm to 1.0 mm as described above.

The optical unit 110 may be formed in a round or polygonal shape by arranging a plurality of optical fibers 111 in parallel, so that a gap in the optical unit 110 may be removed or minimized to minimize an empty space which is a cause increasing the diameter of the optical unit 110. Thus, the diameter of the cable 100 may be minimized by minimizing the diameter of the optical unit 110 and arranging the conductor units 130 in parallel around the optical unit 110 to minimize a gap in the optical unit 110.

As illustrated in FIG. 3, when one optical unit 110 is provided at the center part of the cable 100, a ratio of the diameter do' of the optical unit 110 to the diameter dc' of each of the conductor units 130, i.e., (optical unit diameter do'/conductor unit diameter dc'), may be increased to make a cross section of the cable 100 have a shape similar to a round shape, as the number of conductor units 130 is increased.

Referring to FIG. 3(a), although it is illustrated that the optical unit 110 and the conductor units 130 are not significantly different in diameter, when five conductor units 130 are provided and one optical unit 110 is located at a center part of the cable 100, a ratio of a diameter of the optical unit 110 to a diameter of each of the conductor units 130 may be less than '1'. That is, empty spaces between the conductor units 130 may be increased according to the diameter of the optical units 110. Thus, the diameter of the cable 100 may be minimized by minimizing the diameter of the optical unit 110. In this case, the diameter of the optical unit 110 may be less than that of the conductor units 130.

In contrast, as illustrated in FIGS. 3(b) to (g), a ratio of the diameter do' of the optical unit 110 to the diameter dc' of each of the conductor units 130, i.e., (optical unit diameter do'/conductor unit diameter dc'), may be increased according to the number of the conductor units 130.

That is, in the optical and electrical composite multimedia cable 100 according to the present invention in which one optical unit 110 is provided at the center part and the conductor units 130 are provided around the optical unit 110, a ratio of the diameter do' of the optical unit 110 to the diameter dc' of each of the conductor units 130, i.e., (optical unit diameter do'/conductor unit diameter dc'), may have various values which are in a range of about 0.7 to about 2.9.

As illustrated in FIG. 3, when the optical and electrical composite multimedia cable 100 was formed in a round shape by providing one optical unit 110 at the center part and a plurality of conductor units 130 around the optical unit 110 to minimize a gap in the cable 100, the diameter D' of the cable 100 including the optical unit 110 having 12-core optical fibers and 12-core conductor units 130 did not exceed 4.8 mm. Although the number of conductors and the number of the optical fibers were twice or more than those of a conventional optical and electrical composite multimedia cable including an optical unit having four-core optical fibers and six conductor units, the diameter of the cable 100 was less than a larger width of the conventional cable which was 5.0 mm.

In conclusion, if one optical unit and four to twelve conductor units are provided, a cable has a minimum diameter when the optical unit is located at a center part of the cable and the conductor units are located to surround the optical unit. Although a case in which four conductor units are provided is not shown, it would be understood that an optical unit may be disposed at a center part of a cable and the conductor units may be disposed around the optical unit with reference to FIGS. 1 and 2.

By appropriately adjusting the diameters of an optical unit 110 and conductor units 130 as illustrated in FIGS. 1 and 3, each of the conductor units 130 may contact with two conductor units 130 adjacent thereto and the optical unit 110 at the center part to minimize an empty space in the cable 100, thereby minimizing the diameter of the cable. A cross section of the cable finished according to the above method may have a shape similar to a round shape as described above.

Figure 4:
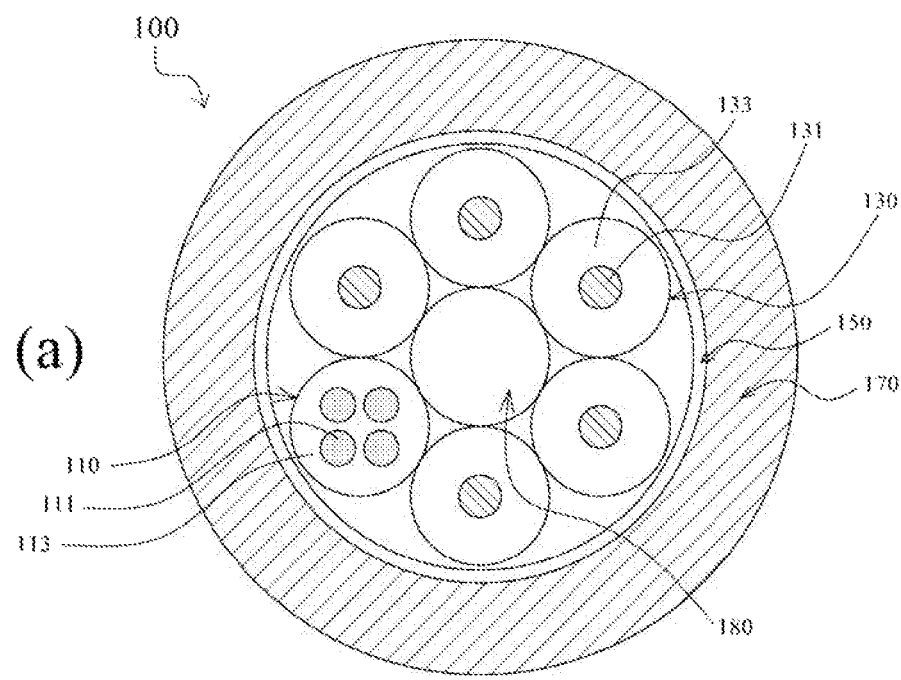
FIG. 4 illustrates cross-sectional views of optical and electrical composite multimedia cables according to other embodiments of the present invention.
Figure 4:
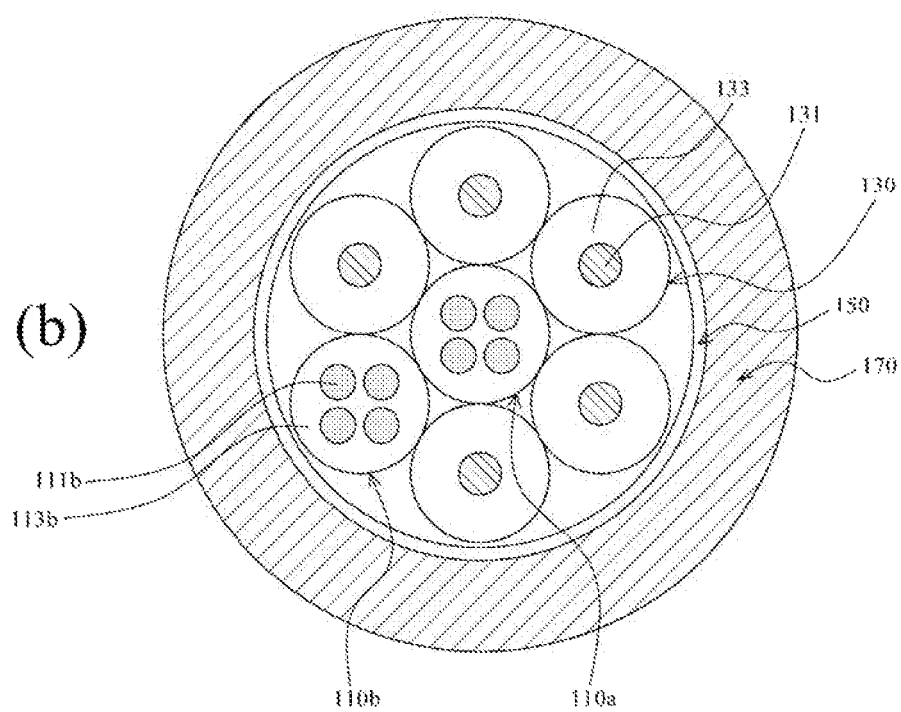
Figure 5:
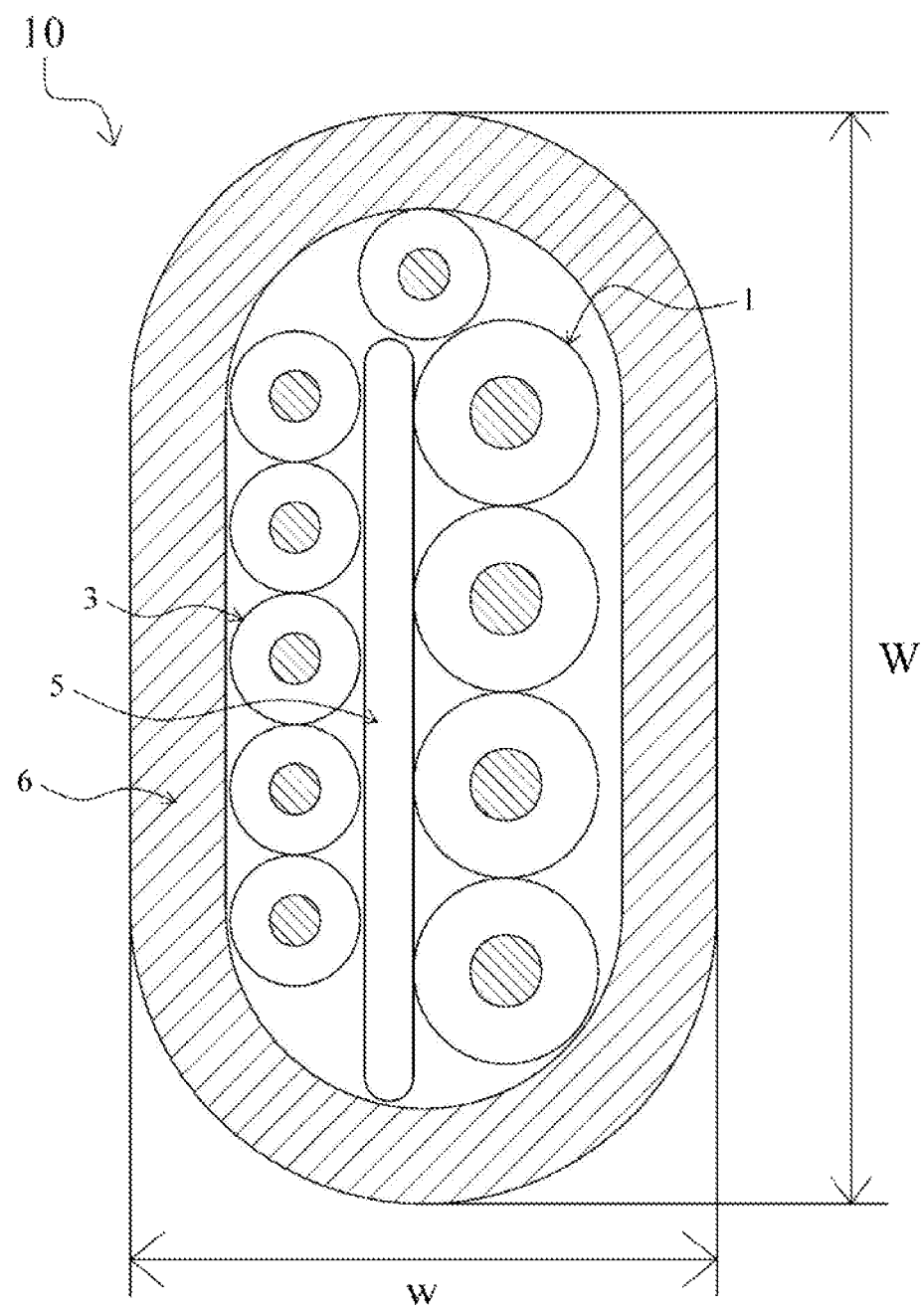
FIG. 5 is a cross-sectional view of one of conventional optical and electrical composite multimedia cables.
Figure 6:
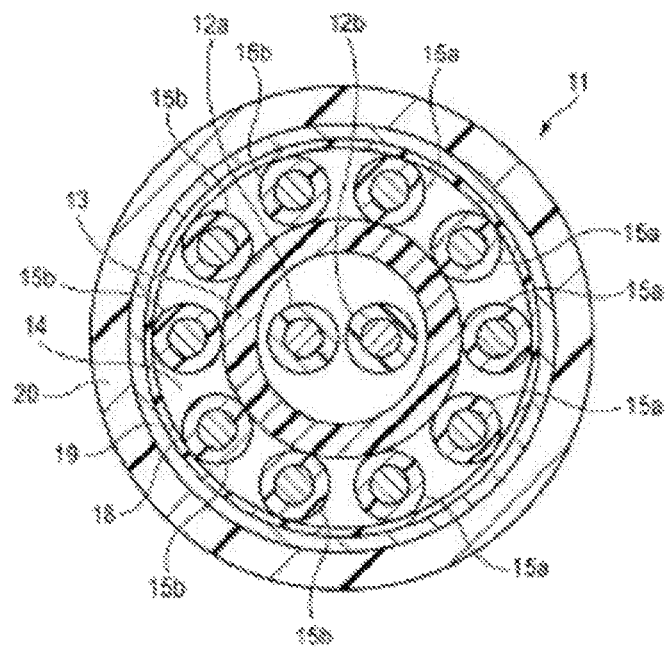
FIG. 6 illustrates a reference diagram of Japanese unexamined patent application publication No. 2013-218839.
Figure 7:
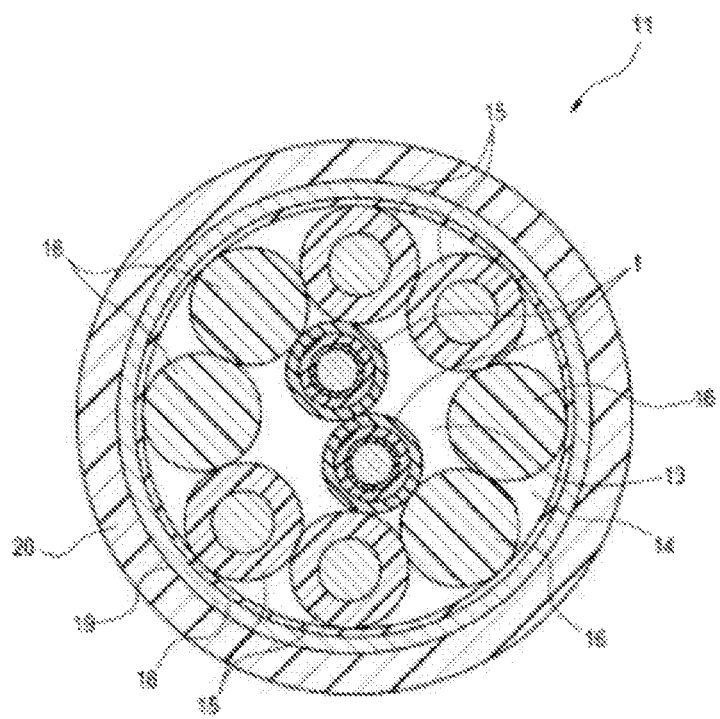
FIG. 7 illustrates a reference diagram of Japanese unexamined patent application publication No. 2012-053121.

FIG. 4 illustrates cross-sectional views of optical and electrical composite multimedia cables 100 according to other embodiments of the present invention.

In detail, FIG. 4(a) is a cross-sectional view of an optical and electrical composite multimedia cable 100 in which a tension wire 180 is located at a center part of the cable 100 and four conductor units 130 and one optical unit 110 are located around the tension wire 180. FIG. 4(b) is a cross-sectional view of an optical and electrical composite multimedia cable 100 in which one optical unit 110 is located at a center part of the cable 100 and five conductor units 130 and one or more optical units 110 are located around the optical unit 110.

In the embodiment of FIG. 1 or 3, the optical unit 110 is located at the center part of the cable 100 so that the cable 100 may have a round cross section. However, an element located at the center part of the cable 100 is not limited to the optical unit 110.

That is, the cable 100 may be configured to have a cross section having a shape similar to a round shape by providing the tension wire 180 at the center part of the cable 100 rather than the optical unit 110 and providing the optical unit 110 and conductor units 130 around the tension wire 180. The tension wire 180 may be added to reinforce mechanical hardness of the cable 100 or be interposed into the cable 100 to simply maintain the round shape of the cable 100.

In the embodiments of FIG. 1 to FIG. 4(a), one optical unit 110 is provided but a plurality of optical units 110 may be provided.

That is, the number of optical units 110 and the number of optical fibers 111 included in each of the optical unit 110 may vary according to a user's demand or new standards.

In the embodiment of FIG. 4(b), the cable 100 may have a cross section having a round shape by providing a first optical unit 110a at a center part of the cable 100 and providing a second optical unit 110b and five conductor units 130 around the first optical unit 110a.

That is, in the optical and electrical composite multimedia cable 100 according to the present invention, when two or more optical units 110 are provided, one of the optical units 110 may be provided at the center part and the other optical units 110 and the conductor units 130 are provided around the optical unit 110 at the center part.

Thus, a design of an optical and electrical composite multimedia cable according to the present invention may be variously changed and various products may be produced according to a user's demand by adjusting the number of optical units and the number of conductor units as needed or interposing a tensile wire into a location of the optical units or locations of the conductor units.

Although exemplary embodiments of the present invention are described in the present disclosure, it would be apparent to those of ordinary skill in the art that the present invention may be embodied in many different forms without departing from the idea and scope of the invention as defined in the appended claims. Therefore, the scope of the invention should be defined by the appended claims, and all differences within the scope will be construed as being included in the present invention.

The invention claimed is:

1. An optical and electrical composite multimedia cable comprising:
   an optical unit including a plurality of optical fibers and an optical-fiber protective layer, the optical-fiber protective layer formed by filling gaps formed between the optical fibers spaced apart from each other with curable resin and covering outer sides of the optical fibers with the curable resin and then curing the curable resin without a ribbon process;
a plurality of conductor units each including a conductor and an insulator covering the conductor; and
an outer jacket provided around the optical unit and the conductor units,
wherein a ratio of a total area of the optical fibers to an area of the optical unit is in a range of 30% to 80%, and
wherein the gaps between the optical fibers are filled with the curable resin,
wherein the plurality of conductor units are in contact with the optical unit.

2. The optical and electrical composite multimedia cable of claim 1, wherein the curable resin comprises UV curable acrylate resin and is cured by UV radiation.

3. The optical and electrical composite multimedia cable of claim 1, wherein the optical unit has a diameter of 0.5 mm to 2.0 mm.

4. The optical and electrical composite multimedia cable of claim 1, wherein the outer jacket has a thickness of 0.3 mm to 1.0 mm.

5. The optical and electrical composite multimedia cable of claim 1, wherein the distances between the optical fibers and an outer circumference surface of the optical unit is 0.03 mm to 0.20 mm.

6. The optical and electrical composite multimedia cable of claim 1, wherein the optical unit is provided at a center part of the cable and the conductor units are provided to surround the optical unit.

7. The optical and electrical composite multimedia cable of claim 6, wherein each of the conductor units contacts two conductor units adjacent thereto and the optical unit.

8. The optical and electrical composite multimedia cable of claim 1, wherein each of the conductor units comprises one conductor and has a diameter of 0.5 mm to 1.0 mm.

9. The optical and electrical composite multimedia cable of claim 1, wherein a tensile material is provided at an inner side of the outer jacket to cover the optical unit and the conductor units.

10. The optical and electrical composite multimedia cable of claim 1, wherein one optical unit and two to twelve conductor units are provided.

11. The optical and electrical composite multimedia cable of claim 10, wherein, when one optical unit and two or three conductor units are provided, the optical unit and the conductor units are arranged in a triangular or rectangular shape.

12. The optical and electrical composite multimedia cable of claim 10, wherein, when one optical unit and four to twelve conductor units are provided, the optical unit is provided at the center part and the conductor units are arranged to surround the optical unit.

13. The optical and electrical composite multimedia cable of claim 1, further comprising at least one tension wire at an inner side of the outer jacket.

14. The optical and electrical composite multimedia cable of claim 1, wherein one optical unit and six conductor units surrounding the optical unit are arranged,
and a diameter of the optical and electrical composite multimedia cable is 2.1 mm to 6.0 mm.

15. An optical and electrical composite multimedia cable comprising:
an optical unit including a plurality of glass optical fiber (GOF) type optical fibers and an optical-fiber protective layer which is formed by curing UV curable acrylate resin, without a ribbon process, to cover the optical fibers and fill gaps that are formed between the optical fibers spaced apart from each other, the optical unit having a diameter of 0.5 mm to 2.0 mm;
a plurality of conductor units each including one conductor and an insulator covering the conductor and having a diameter of 0.5 mm to 1.0 mm, the conductor units provided around the optical unit;
a tensile material surrounding the conductor units; and
an outer jacket covering an outer side of the tensile material and having a thickness of 0.3 mm to 1.0 mm,
wherein a ratio of the diameter of the optical unit to the diameter of each of the conductor units is in a range of 0.7 to 2.9, and a diameter of the cable is in a range of 2.1 mm to 6.0 mm and wherein a ratio of a total area of the optical fibers to an area of the optical unit is in a range of 30% to 80%,
wherein the plurality of conductor units are in contact with the optical unit.

16. The optical and electrical composite multimedia cable of claim 15, wherein six conductor units are arranged around the optical unit provided at a center part of the cable.

17. The optical and electrical composite multimedia cable of claim 15, wherein each of the conductor units contacts two conductor units adjacent thereto and the optical unit.

18. The optical and electrical composite multimedia cable of claim 15, wherein the distances between the optical fibers and an outer circumference surface of the optical unit are 0.03 mm to 0.20 mm.

* * * * *